United States Patent [19]
Asano et al.

[11] Patent Number: 5,156,690
[45] Date of Patent: Oct. 20, 1992

[54] BUILDING LOW YIELD RATIO HOT-DIP GALVANIZED COLD ROLLED STEEL SHEET HAVING IMPROVED REFRACTORY PROPERTY

[75] Inventors: Hirohide Asano; Kazuo Koyama; Takaji Takahashi; Nobuhiko Matsuzu, all of Kimitsu, Japan

[73] Assignee: Nippon Steel Corporation, Tokyo, Japan

[21] Appl. No.: 616,654

[22] Filed: Nov. 21, 1990

[30] Foreign Application Priority Data

Nov. 22, 1989 [JP] Japan .................... 1-301983
Jan. 30, 1990 [JP] Japan .................... 2-20179

[51] Int. Cl.$^5$ ............... C21D 8/00; C23C 2/06
[52] U.S. Cl. ................... 428/659; 148/332; 148/333; 148/533
[58] Field of Search ........... 148/2, 12 D, 156, 12 R, 148/320, 332, 333; 428/681, 659

[56] References Cited

U.S. PATENT DOCUMENTS 4,525,598  6/1985  Tsukamoto et al. ............ 428/659
4,889,566 12/1989  Okada et al. .................. 148/2

FOREIGN PATENT DOCUMENTS 0085963  5/1982  Japan .

*Primary Examiner*—R. Dean
*Assistant Examiner*—Sikyin Ip
*Attorney, Agent, or Firm*—Wenderoth, Lind & Ponack

[57] ABSTRACT

A building low yield ratio hot-dip galvanized cold rolled steel sheet having an improved refractory property, consists essentially of, by weight, 0.1% or less of C, 0.1 to 1.5% of Mn, 0.1% of less of P, 0.06% or less of Al, 0.6 to 2.0% of Cu, and a remainder of Fe and unavoidable impurities and having a 0.6 times or more yield point strength at 600° C. compared to that at normal temperatures. The method of forming the steel sheet comprises the steps of: forming a slab from a steel consisting essentially of, by weight, 0.1% or less of C, 0.1 to 1.5% of Mn, 0.1% or less of P, 0.06% or less of Al, 0.6 to 2.0% of Cu, and a remainder of Fe and unavoidable impurities, immediately or after heating the slab at a temperature of 1200° C. or less, hot rolling the slab at a temperature of 750° C. or more and cold rolling, effecting a continuous hot-dip galvanizing process, heating the rolled slab at a temperature of 700° to 900° C. in a reducing atmosphere, cooling the rolled slab at an average cooling rate of 3° C./sec or more and dipping the rolled slab in a hot-dip galvanizing bath.

14 Claims, No Drawings

BUILDING LOW YIELD RATIO HOT-DIP GALVANIZED COLD ROLLED STEEL SHEET HAVING IMPROVED REFRACTORY PROPERTY

BACKGROUND OF THE INVENTION

1. Field of the Invention

This invention relates to a building low yield ratio hot-dip galvanized cold rolled steel sheet having an improved refractory property and used for various building structures in the fields of pre-fab building material, civil and marine structures, and a method of producing same.

2. Description of the Related Art

The refractory property of a building structure is important, and various countermeasures to the refractory property are effected in all buildings, whether large or small. Nevertheless, as described in the Japanese unexamined patent publication (Kokai) No. 63-47451, countermeasures against fire are actually effected by using a refractory coating, and thus the building costs are increased and the utilizable space for a building structure is reduced.

Recently, the refractory designs were examined and a new Refractory Design Law for Building Structures was established in 1987. At that time, a conventional requirement for a tolerance of the steel material to a temperature of a fire, i.e., 350° C. or less, was removed, and thus the ability of a refractory coating can be determined by a high temperature strength of a steel sheet at a load actually effected on a building structure, and when a high temperature strength of a steel sheet material can be ensured, the use of the steel sheet without such a coating becomes possible.

Recently, the present inventors examined the technology for a Cu-added refractory building-hot rolled steel sheet, and a refractory building hot-dip galvanized hot rolled steel sheet, and filed Japanese patent application Nos. 1-26225 and 1-16446, respectively, for these inventions.

It is well know that, as a roof material or a pre-fab building material of a building structure, a cold rolled steel sheet or a cold rolled steel hoop is used as a raw material.

The present inventor filed, as a patent application relating to a technology of a refractory building cold rolled steel sheet, Japanese Patent Application No. 1-27297.

A corrosion resistance is also necessary for a building steel, and thus a technology of galvanizing a cold rolled steel sheet by a continuous hot-dip galvanizing process having an improved productivity and reduced costs is required.

When the galvanizing of a cold rolled steel hoop or steel sheet is effected by using the continuous hot-dip galvanizing process, the feeding speed cannot be effectively lowered because of the needs of mass production. Further, to recrystallize and obtain an improved plating adhesion, the reducing temperature cannot be greatly lowered. Further in this process, a quenching process is required after an annealing.

It is difficult to ensure the high temperature strength of a conventional steel because of a crystal grain growth and coarsening of a precipitate carbide solution, etc. Further, although a high alloy heat resisting metal exists as an Fe system, a Ni system and a Ti system, this high alloy heat resisting metal is too expensive for use as a material in a large amount for a building.

SUMMARY OF THE INVENTION

An object of the present invention is to provide a building low yield ratio hot-dip galvanized cold rolled steel sheet having an improved refractory property, which can be used as a roofing material and pre-fab building material, is easily formable in a forming process, and has a superior corrosion resistance.

Another object of the present invention is to provide a method of producing the above-mentioned building low yield hot-dip galvanized cold rolled steel sheet having an improved refractory property.

Accordingly, there is provided a building low yield ratio hot-dip galvanized cold rolled steel sheet having an improved refractory property and consisting essentially of, by weight, 0.1% or less of C, 0.1 to 1.5% of Mn, 0.1% or less of P, 0.06% or less of Al, 0.6 to 2.0% of Cu, and a remainder of Fe and unavoidable impurities and having a 0.6 times or more yield point strength at 600° C. compared to that at normal temperatures.

There is further provided a method of producing a building low yield ratio hot-dip galvanized cold rolled steel sheet having an improved refractory property, comprising the steps of:

forming a slab from a steel consisting essentially of, by weight, 0.1% or less of C, 0.1 to 1.5% of Mn, 0.1% or less of P, 0.06% or less of Al, 0.6 to 2.0% of Cu, and a remainder of Fe and unavoidable impurities, immediately or after heating the slab at a temperature of 1200° C. or less, hot rolling the slab at a temperature of 750° C. or more, cold rolling the slab, and carrying out a continuous hot-dip galvanizing by heating the rolled slab at a temperature of 700° to 900° C. in a reducing atmosphere, cooling the rolled slab at an average cooling rate of 3° C./ sec or more, and dipping the rolled slab in a hot-dip galvanizing bath, so that the obtained product has a 0.6 times or more yield point strength at 600° C. compared to that at normal temperatures.

There is further provided a building low yield ratio hot-dip galvanized cold rolled steel sheet having an improved refractory property, consisting essentially of, by weight, 0.02 to 0.1% of C, 0.3% or less of Si, 0.3 to 1.5% of Mn, 0.05% or less of P, 0.05% or less of Al, 0.6 to 2.0% of Cu, and a remainder of Fe and unavoidable impurities and having a 0.6 times or more yield point strength at 600° C. compared to that at normal temperatures. The above-mentioned Si containing steel sheet preferably contains 0.2 to 1.0 of Ni by Ni/Cu.

There is further provided a method of producing a building low yield ratio hot-dip galvanized cold rolled steel sheet having an improved refractory property, comprising the steps of:

forming a slab from a steel consisting essentially of, by weight, 0.02 to 0.1% of C, 0.3% or less of Si, 0.3 to 1.5% of Mn, 0.05% or less of P, 0.05% or less of Al, 0.6 to 2.0% of Cu, and a remainder of Fe and unavoidable impurities, immediately or after heating the slab at a temperature of 950° to 1150° C., hot rolling the slab at a temperature of 750° to 900° C. to form a hot rolled coil, cold rolling the coil, and effecting a continuous hot-dip galvanizing by heating the coil at a temperature of 700° to 900° C. in a reducing atmosphere, cooling the coil at an average cooling rate of 3° C./sec or more and dipping the coil in a hot-dip galvanizing bath, so that the obtained product has a 0.6 times or more yield point strength at 600° C. compared to that at normal temperatures.

According to the present invention, there is also provided a method of producing a building low yield ratio hot-dip galvanized cold rolled steel sheet having an improved refractory property, comprising the steps of:

forming a slab from a steel consisting essentially of, by weight, 0.02 to 0.1% of C, 0.3% or less of Si, 0.3 to 1.5% of Mn, 0.05% or less of P, 0.05% or less of Al, 0.6 to 2.0% of Cu, 0.2 to 1.0 of Ni by Ni/Cu and a remainder of Fe and unavoidable impurities, immediately or after heating the slab at a temperature of 950° to 1200° C., hot rolling the slab at a temperature of 750° to 900° C. to form a hot rolled coil, cold rolling the coil, and effecting a continuous hot-dip galvanizing by heating the coil at a temperature of 700° to 900° C. in a reducing atmosphere, cooling the coil at an average cooling rate of 3° C./sec or more and dipping the coil in a hot-dip galvanizing bath, so that the obtained product has a 0.6 times yield point strength at 600° C. compared to that at normal temperatures.

The reasons for the limitation of the numerical values of the constituent features of the present invention will now be explained.

The amount of C of the steel according to the present invention is defined as 0.1% or less, preferably 0.02 to 0.1%. In the present invention carbon (C) is necessary for strength, and if the steel contains less than 0.02% of C, it is difficult to provide the required strength. On the other hand, if more than 0.1% C, a quenching structure such as martensite, etc., is easily formed and the bending property is reduced.

The manganese (Mn) content is defined as 0.1 to 1.5%, preferably 0.3 to 1.5%. At a content of less than 0.1% C, the steel does not have a sufficient strength, but at a content of more than 1.5% C, a quenching structure is easily formed and the bending property becomes poor.

The silicon (Si) content is preferably defined as 0.3% or less. At a content of more than 0.3% Si, the adhesion becomes poor.

The phosphorus content (P) is defined as 0.1% or less, preferably 0.05% or less. At a content of more than 0.1% P, the toughness becomes low. Since a content of more than 0.03% P improved the corrosion resistance, the lower limit of P is preferably defined as 0.03%.

The aluminum (Al) content is defined as 0.06% or less, preferably, 0.05% or less. Al is necessary as deoxidizing agent, but a content of more than 0.06% Al, or more than 0.05% Al, lowers the plating adhesion force.

Further, the copper (Cu) content is defined as 0.6 to 2.0%. Cu is a very important element in the present invention, because Cu provides the high temperature strength which is the aim of the present invention, and ensures the normal temperature strength. Although the strengthening mechanism by Cu has not been clarified, it is believed that the normal temperature strength is due to the solid solution strengthening or slight cluster strengthening caused by Cu. A content of less than 0.6% Cu does not satisfy the degree of the oversaturation of Cu and does not provide a necessary high temperature strength. On the other hand, a content of more than 2.0% Cu leads to hot cracking.

The Ni content is preferably defined as 0.2 to 1.0 by Ni/Cu. The addition of Ni is effected to prevent the hot cracking. A content of less than 0.2 of Ni has no effect, and a content of more than 1.0 of Ni greatly increases costs, because of the high price of Ni, and thus causes an economical problem.

Further, the hot rolling according to the present invention, is defined as follows.

The hot rolling is carried out immediately after a slab-casting, i.e., a CC-direct rolling, or is carried out after heating a cast slab. The heating temperature is defined as 1200° C. or less, preferably, 950 to 1150° C. without the addition of Ni, and 950° to 1200° C. with the addition of Ni. If the upper limit of the heating temperature is exceeded, hot cracking cannot be avoided. When the above-mentioned CC-direct rolling is carried out, a heat retaining of the slab or heating edge of the slab can be effected at 950° C. or more, and this heating provides for a sufficient dissolution of Cu in the slab.

The finishing temperature of the hot rolling is defined as 750° C. or more, preferably 750° to 900° C. A finishing temperature of the hot rolling of less than 750° C. leads to a Cu precipitate deriving from a strain, and thus an amount of an oversaturated Cu at the normal temperature, which is needed for a high temperature strength, cannot be ensured. Further, to obtain a sufficient amount of the oversaturated Cu, the finishing temperature of the hot rolling is preferably 800° C. or more. Note, the upper limit, i.e., 900° C., of the finishing temperature thereof is determined from the capacity of the continuous casting installation.

After a hot rolled coil is cold rolled to form a cold rolled coil, the coil is hot-dip galvanized in a continuous hot-dip galvanizing process. In the galvanizing process, a heating temperature under a reducing atmosphere is defined as 700° to 900° C. A temperature of less than 700° C. cannot provide a sufficiently complete recrystallization, deteriorates the bending property, and generates precipitated Cu, and thus the required high temperature property and normal temperature property cannot be obtained. To ensure a complete recrystallization and an amount of an oversaturated Cu, a heating temperature of 800° C. or more is preferable. On the other hand, a temperature of more than 900° C. coarsens the crystal grains and lowers the normal temperature strength.

After heating the cold rolled coil at 700° to 900° C., the coil is cooled at an average cooling rate of 3° C./sec or more, since at a cooling rate of less than 3° C./sec, i.e., a gradual cooling, Cu is precipitated, and a required high temperature property and normal temperature property cannot be obtained. About 30° C./sec can be used as the upper limit.

According to the present invention, there is still further provided a building low yield ratio hot-dip galvanized cold rolled steel sheet having an improved refractory property, consisting essentially of, by weight, 0.01% or less of C, 0.1 to 0.5% of Mn, 0.1% or less of P, 0.06% or less of Al, 0.6 to 2.0% of Cu, and a remainder of Fe and unavoidable impurities and having a 0.6 times or more yield point strength at 600° C. compared to that at normal temperatures.

In the present invention, the steel sheet preferably contains 0.008 to 0.2% of Ti and/or 0.008 to 0.1% of Nb, and further, preferably contains 0.0001 to 0.003% of boron (B) or/and 0.2 to 1.0 of Ni by Ni/Cu.

According to the present invention, there is further provided a method of producing a building low yield ratio hot-dip galvanized cold rolled steel sheet having an improved refractory property, comprising the steps of:

forming a slab from a steel essentially consisting of, by weight, 0.01% or less of C, 0.1 to 0.5% of Mn, 0.1% or less of P, 0.06% or less of Al, 0.6 to 2.0% of Cu, and a remainder of Fe and unavoidable impurities, immediately or after heating the slab at a temperature of 1150° C. or less, hot rolling the slab at an $Ar_3$ critical temperature to form a hot rolled coil and cold rolling the coil, effecting a continuous hot-dip galvanizing by heating the coil at a temperature of 750° to 900° C. with an average temperature rise speed of 1° C./sec or more in a reducing atmosphere, cooling the coil at an average cooling rate of 3° C./sec or more and dipping the coil in a hot-dip galvanizing bath, so that the obtained product has a 0.6 times or more yield point strength at 600° C. compared to that at normal temperatures. The steel preferably further contains 0.008 to 0.2% of Ti or/and 0.008 to 0.10% of Nb. Further, the steel preferably contains 0.0001 to 0.003% of B or/and 0.2 to 1.0 of Ni by Ni/Cu.

The reasons for the limitation of the numerical values of the constituent features of the present invention will be further explained.

The C content is defined as 0.01% or less. Namely, from the viewpoint of formability, the steel of the present invention is an extremely low carbon type. If necessary, Ti or/and Nb is added to form an IF (Interstitial Free) Steel. When the amount of C is large, the amount of Ti and/or Nb required to form the IF steel becomes large, with the result that the costs become high, and the workability and the toughness are lowered, and thus 0.005% or less of C is preferable.

The amount of Mn is defined as 0.1 to 0.5%. The addition of less than 0.1% leads to FeS brittleness, and the addition of more than 0.5% lowers the plating adhesion force. The amounts of P, Al and Cu are defined as 0.1% or less, 0.06% or less and 0.6 to 2.0%, for the same reasons as previously explained.

In the present invention, 0.008 to 0.2% of Ti and/or 0.008 to 0.1% of Nb are preferably added to form carbides. If these amounts are less than the lower limit, the steel does not become a required IF Steel, and when an overaging treatment is not effected after dipping a coil into a hot-dip galvanizing bath, problems such as stretcher strain arise. On the other hand, at amounts more than the upper limit, the costs become high, and the formability is deteriorated due to the solid-dissolved Ti and Nb. The amount of Ti and/or Nb is more preferably added in accordance with the following expression:

$$0.05 \geq 12/48 [Ti (\%)] + 12/93 [Nb (\%) \geq [C (\%)]].$$

In the present invention, B and/or Ni can be added if necessary. B (boron) is a grain boundary strengthening element. In the IF Steel according to the present invention, the content of a solid-dissolved carbon, which is also a grain boundary strengthening element, is small, and thus B is added to supplement this function. An amount of less than 0.0001% of B has little effect, and an amount of more than 0.003% of B causes a saturation of the effects. Ni is added as explained above.

The hot rolling conditions are defined as follows.

The hot rolling is immediately carried out after slab-casting (CC-direct rolling), or it is carried out after heating a cast slab at 1150° C. or less, which is effected to avoid hot cracking.

The finishing temperature of the hot rolling is defined as the $Ar_3$ critical point. Note, below the $Ar_3$ critical point the obtained hot rolled coil has a worked structure that must be hardened. The upper limit of the finishing temperature of the hot rolling is preferably 950° C.

The steel is cold rolled at a cold rolling reduction ratio of 5 to 90%. At a ratio lower than the lower limit (5%), the cold rolling effect is not obtained, and at a ratio above the upper limit (90%), the required surface flatness of the product cannot be obtained.

Subsequently, a hot-dip galvanizing process is effected by a continuous hot-dip galvanizing process, at an average temperature elevation speed of 1° C./sec or more. Below this value, Cu is precipitated when passing through a Cu-precipitating temperature region, and a required tensile strength cannot be obtained. Note, a speed of about 70° C./sec of the average temperature elevation speed can be used.

The heating during the hot-dip galvanizing process is carried out at 750° to 900° C., and the average cooling rate is 3° C./sec or more. The reason for these limited values is substantially the same as explained above. Particularly, a cooling rate of about 100° C./sec can be used. An amount of 0.01 to 20% of Al can be added to a galvanizing bath used in the present invention.

Further, a low melting point alloy such as Pd-, Cd-, Sn- or Sb-alloy or Mg, can be added thereto in an amount of 1% or less.

DESCRIPTION OF THE PREFERRED EMBODIMENTS

The embodiments of the present invention will now be explained.

After molten steels having the compositions shown in Tables 1 and 2 were produced by a convertor, the molten steels were continuously cast to form slabs. Thereafter, the slabs were immediately heated and hot rolled, and then, the obtained hot rolled coils were cold-rolled, and hot-dip galvanized by a continuous galvanizing process.

Table 3 shows the hot rolling conditions, cold rolling conditions, and continuous hot-dip galvanizing conditions. Tensile tests at normal temperatures were carried out by using JIS Z 2201 No. 5 test pieces with reference to JIS Z 2241. High temperature tests were carried out by elevating the temperature to 600° C. at the rate of 10° C./min., maintaining that temperature for 15 mins., and then carrying out the tensile tests, whereby the yield points were measured.

Further, when the obtained hot rolled coil was subjected to cold rolling, the appearance, i.e., surface defects derived from Cu, of the coil was observed over the whole length of the coil and was classified as follows: ⊚: good, o: substantially good, Δ: few defects found, X: many defects found (defective)

The workability of the material was evaluated by its bending property. JIS Z 2204 No. 3 test pieces were used, and the test method was carried out in accordance with JIS Z 2248. The bending angle was defined as 180°; test pieces not cracked by the bending test are shown as o, and cracked test pieces are shown as x.

The plating adhesion property of the material was evaluated by an impact test. In this impact test method, a hemispherical punch having a diameter of 12.7 mm was dropped on a steel sheet, a tape was covered over the formed circular dent, the tape was peeled off, and the amount of plating material adhered to the tape was evaluated by the naked eye.

The results are shown in Table 3 as ⊙: few peeled points (good), o: several peeled points, Δ: more peeled portions (need to be repaired), x: many peeled portions (defective).

Table 3 shows the obtained characteristic values of the steel of the present invention and the comparative steel. The steel according to the present invention has no Cu problems in actual use, and satisfies the requirement for a yield point strength of 25 kgf/mm² or more, and further, showed a superior yield ratio, i.e., yield point strength/tensile strength, of 80% or less, which is necessary for the earthquake resisting property.

Furthermore, the steel of the present invention has an improved bending property and a high high-temperature yield point strength at a temperature of 600° C. Namely, the steel of the present invention meets the requirement for a ratio of the high-temperature yield point strength to the normal temperature yield point strength of 0.6 or more. Note, most of the ratios obtained by the present invention were at a high level of, e.g., 0.7 or more. Further, the steel of the present invention has a superior plating adhesion force.

On the other hand, as shown in Tables 1 to 3, the steel sheet (or hoop) of the comparative examples showed a low level in at least one of the above characteristics.

TABLE 1

| Steel Mark | Composition (wt %) | | | | | | | Ni/Cu | Note |
| --- | --- | --- | --- | --- | --- | --- | --- | --- | --- |
| | C | Si | Mn | P | Al | Cu | Ni | | |
| A | 0.075 | 0.21 | 1.48 | 0.013 | 0.030 | 1.65 | 0.82 | 0.50 | Invention |
| B | 0.054 | 0.01 | 0.93 | 0.026 | 0.033 | 1.53 | — | — | Invention |
| C | *0.014 | 0.23 | *0.21 | 0.016 | 0.045 | 0.62 | — | — | Comparative Example |
| D | 0.078 | 0.16 | 0.73 | 0.016 | 0.018 | 1.50 | 1.36 | 0.91 | Invention |
| E | 0.031 | 0.02 | 0.77 | 0.030 | 0.039 | *0.42 | — | — | Comparative Example |
| F | *0.157 | 0.29 | *1.78 | *0.083 | 0.048 | 1.12 | — | — | Comparative Example |
| G | 0.080 | 0.48 | 1.30 | 0.024 | *0.089 | 1.78 | 0.59 | 0.33 | Comparative Example |
| H | 0.065 | 0.03 | 1.10 | 0.024 | 0.023 | 1.91 | 0.82 | 0.43 | Invention |
| I | 0.044 | 0.07 | 0.40 | 0.040 | 0.042 | *2.62 | 0.34 | *0.13 | Comparative Example |

*Outside the range of the present invention

TABLE 2

| Steel Mark | Composition (wt %) | | | | | | | | | Ni/Cu | ⊙ Expression | Note |
| --- | --- | --- | --- | --- | --- | --- | --- | --- | --- | --- | --- | --- |
| | C | Mn | P | Al | Cu | Ti | Nb | B | Ni | | | |
| J | 0.003 | 0.20 | 0.005 | 0.040 | 1.27 | — | — | — | — | — | — | Invention |
| K | 0.004 | 0.18 | 0.006 | 0.045 | 1.50 | — | — | — | 0.82 | 0.55 | — | Invention |
| L | 0.004 | 0.31 | 0.045 | 0.036 | 1.33 | 0.113 | 0.049 | — | — | — | 0.035 | Invention |
| M | 0.003 | 0.18 | 0.005 | 0.047 | 1.08 | — | 0.050 | — | 0.73 | 0.68 | 0.006 | Invention |
| N | 0.004 | 0.23 | 0.004 | 0.049 | 1.25 | 0.056 | — | 0.0007 | 0.67 | 0.54 | 0.014 | Invention |
| O | 0.006 | 0.46 | 0.006 | 0.042 | *0.48 | 0.048 | 0.023 | — | — | — | 0.015 | Comparative Example |
| P | *0.028 | 0.36 | 0.002 | 0.048 | 1.05 | 0.158 | 0.098 | — | — | — | 0.052 | Comparative Example |
| Q | 0.007 | 0.38 | 0.040 | 0.039 | *2.54 | 0.033 | 0.023 | — | 0.13 | *0.05 | 0.011 | Comparative Example |
| R | 0.003 | 0.29 | 0.006 | 0.042 | 1.73 | 0.043 | — | — | 0.89 | 0.51 | 0.011 | Invention |
| S | 0.008 | *0.85 | 0.088 | *0.095 | 0.95 | 0.028 | 0.024 | — | — | — | 0.010 | Comparative Example |
| T | 0.004 | 0.39 | *0.165 | 0.042 | 1.12 | *0.355 | *0.250 | — | — | — | 0.121 | Comparative Example |

*Outside the range of the present invention
⊙ 12/48 [Ti (%)] + 12/93 [Nb (%)]

TABLE 3

| No. | Steel mark | Hot rolling condition | | | Hot-dip galvanizing condition | | | Sheet thickness (mm) | Properties at normal temperature | | | | Properties at 600° C. | | The appearance of the coil | Plating adhesion force Impact test | Note |
|---|---|---|---|---|---|---|---|---|---|---|---|---|---|---|---|---|---|
| | | Heating temperature (°C.) | Finishing temperature (°C.) | Cold rolling reduction (%) | Average temperature elevation (°C./s) | Reducing temperature (°C.) | Average cooling rate (°C./s) | | Yield point strength (kgf/mm²) | Tensile strength (kgf/mm²) | Yield ratio (%) | Bending test 180° | Yield point strength (kgf/mm²) | Ratio of yield strength at 600° C. to yield strength at normal temperature | | | |
| 1 | A | 1150 | 840 | 75 | | 820 | 20 | 0.8 | 40.7 | 52.6 | 77.4 | ⊚ | 26.9 | 0.66 | ⊚ | ⊚ | Invention |
| 2 | A | 1100 | 830 | 75 | | 850 | 25 | 0.8 | 42.5 | 54.4 | 78.1 | ⊚ | 27.8 | 0.65 | ⊚ | ⊚ | Invention |
| 3 | A | 1100 | 810 | 75 | | *680 | 22 | 0.8 | 54.1 | 63.8 | 84.8 | △x | 15.7 | △0.29 | △-x | △-x | Comparative Example |
| 4 | B | 1070 | 835 | 65 | | 820 | 18 | 1.2 | 32.3 | 43.7 | 73.9 | ∘ | 22.4 | 0.69 | ⊚ | ⊚ | Invention |
| 5 | B | *1290 | 840 | 65 | | 780 | 16 | 1.2 | 34.2 | 45.0 | 76.0 | ∘ | 21.6 | 0.63 | △-x | △-x | Comparative Example |
| 6 | B | 1090 | 820 | 65 | | 810 | 16 | 1.2 | 33.8 | 44.3 | 76.3 | ∘ | 22.9 | 0.68 | ⊚ | ⊚ | Invention |
| 7 | *C | | 870 | 75 | | 790 | 24 | 0.8 | 24.1 | 35.5 | 67.9 | ∘ | 13.5 | △0.56 | ⊚ | ⊚ | Comparative Example |
| 8 | D | 1190 | 850 | 75 | | 820 | 22 | 0.8 | 36.7 | 48.4 | 75.8 | ∘ | 26.6 | 0.72 | ⊚ | ⊚ | Invention |
| 9 | D | 1100 | *720 | 75 | | 780 | 20 | 0.8 | 54.6 | 62.7 | 87.1 | ∘ | 20.3 | △0.37 | ⊚ | ⊚ | Comparative Example |
| 10 | *E | 1040 | 850 | 77 | | 800 | 15 | 1.4 | 30.4 | 43.1 | 70.5 | ∘ | 10.0 | △0.33 | ⊚ | ⊚ | Comparative Example |
| 11 | *F | 1080 | 845 | 65 | | 850 | 19 | 1.2 | 74.6 | 81.8 | 91.2 | △x | 23.6 | 0.32 | ⊚ | △-x | Comparative Example |
| 12 | *G | 1120 | 810 | 75 | | 890 | 21 | 0.8 | 41.0 | 52.5 | 78.1 | ∘ | 27.9 | 0.68 | ⊚ | ⊚ | Comparative Example |
| 13 | H | 1140 | 860 | 79 | | 840 | 27 | 0.6 | 37.3 | 49.2 | 75.8 | ∘ | 29.0 | 0.78 | ⊚ | ⊚ | Invention |
| 14 | H | 1120 | 825 | 79 | | 810 | *1.5 | 0.6 | 54.5 | 58.6 | 93.0 | ∘ | 23.0 | △0.42 | ⊚ | ⊚ | Comparative Example |
| 15 | *I | 1180 | 850 | 75 | | 800 | 24 | 0.8 | 35.1 | 49.4 | 71.1 | ∘ | 27.9 | 0.79 | △-x | △-x | Comparative Example |

| No. | Steel mark | Hot rolling condition | | Cold rolling reduction (%) | Hot-dip galvanizing condition | | | Sheet thickness (mm) | Properties at normal temperature | | | | Properties at 600° C. | | The appearance of the coil | Plating adhesion force Impact test | Note |
|---|---|---|---|---|---|---|---|---|---|---|---|---|---|---|---|---|---|
| | | Heating temperature (°C.) | Finishing temperature (°C.) | | Average temperature elevation (°C./s) | Reducing temperature (°C.) | Average cooling rate (°C./s) | | Yield point strength (kgf/mm²) | Tensile strength (kgf/mm²) | Yield ratio (%) | Bending test 180° | Yield point strength (kgf/mm²) | Ratio of yield strength at 600° C. to yield strength at normal temperature | | | |
| 16 | J | 1010 | 840 | 80 | 11 | 810 | 11 | 0.8 | 28.4 | 41.5 | 68.4 | ∘ | 21.3 | 0.75 | ⊚ | ⊚ | Invention |
| 17 | J | 1010 | 840 | 80 | 15 | *670 | 13 | 0.8 | 52.6 | 57.4 | 91.6 | △x | 15.9 | △0.30 | ⊚ | ⊚ | Comparative Example |
| 18 | K | 1030 | 830 | 80 | 13 | 820 | 12 | 0.8 | 30.9 | 43.7 | 70.7 | ∘ | 23.1 | 0.75 | ⊚ | ⊚ | Invention |
| 19 | K | 1040 | 840 | 80 | 70 | 830 | 15 | 0.8 | 31.4 | 44.0 | 71.4 | ∘ | 24.8 | 0.79 | ⊚ | ⊚ | Invention |
| 20 | L | 1085 | 840 | 75 | 12 | 810 | 10 | 0.8 | 27.4 | 42.6 | 64.3 | ∘ | 20.2 | 0.73 | ⊚ | ⊚ | Invention |
| 21 | L | 1085 | 850 | 75 | 10 | 760 | 13 | 0.8 | 29.2 | 45.3 | 64.5 | ∘ | 21.8 | 0.75 | ⊚ | ⊚ | Invention |
| 22 | L | 1085 | 840 | 75 | 13 | *680 | 10 | 0.8 | 53.3 | 59.7 | 89.3 | △x | 14.8 | △0.28 | ⊚ | ⊚ | Comparative Example |
| 23 | L | 1085 | 840 | 75 | *0.5 | 750 | 10 | 0.8 | 41.2 | 50.0 | 82.4 | ∘ | 15.2 | △0.37 | ⊚ | ⊚ | Comparative Example |
| 24 | M | 1045 | 830 | 73 | 10 | 830 | 20 | 1.2 | 29.5 | 43.2 | 68.3 | ∘ | 20.5 | 0.69 | ⊚ | ⊚ | Invention |
| 25 | M | 1050 | 810 | 73 | 14 | 780 | *1 | 1.2 | 40.5 | 49.4 | 82.0 | ∘ | 14.6 | △0.36 | ⊚ | ⊚ | Comparative Example |

TABLE 3-continued

| | | | | | | | | | | | | | | | |
|---|---|---|---|---|---|---|---|---|---|---|---|---|---|---|---|
| 26 | N | 1250 | 810 | 80 | 10 | 790 | 25 | 0.8 | 30.7 | 43.2 | 71.1 | : | 19.1 | 0.62 | ⊙⊙ | Invention Example |
| 27 | N | | 830 | 80 | 13 | 810 | 28 | 0.8 | 28.9 | 42.7 | 67.7 | : | 19.9 | 0.68 | ▲ Δ-x ⊙ Δ-x | Comparative Example |
| 28 | *O | 1100 | 840 | 80 | 12 | 780 | 15 | 1.0 | 27.1 | 37.9 | 71.5 | : | 14.6 | ▲0.54 | ⊙ ⊙ | Comparative Example |
| 29 | *P | 1100 | 850 | 80 | 15 | 800 | 20 | 1.0 | 43.8 | 52.3 | 83.7 | ▲x | 27.2 | 0.62 | ⊙ ⊙ | Comparative Example |
| 30 | *Q | 1120 | 830 | 80 | 10 | 810 | 14 | 1.0 | 31.4 | 47.4 | 66.2 | : | 25.0 | 0.80 | ▲ Δ-x ⊙ Δ-x | Comparative Example |
| 31 | R | 1090 | 870 | 80 | 12 | 800 | 8 | 0.8 | 30.4 | 45.5 | 66.8 | : | 22.3 | 0.73 | ⊙-° ⊙ | Invention Example |
| 32 | R | 1110 | 880 | 80 | 9 | *940 | 13 | 0.8 | 25.0 | 40.0 | 62.5 | : | 13.2 | *0.53 | ⊙ ⊙ | Comparative Example |
| 33 | R | 1080 | 810 | 80 | 10 | 780 | 10 | 0.8 | 28.9 | 43.6 | 66.3 | : | 21.8 | 0.75 | ⊙ ⊙ | Invention Example |
| 34 | *S | 1060 | 850 | 80 | 10 | 790 | 12 | 1.0 | 36.4 | 46.7 | 77.9 | : | 22.0 | 0.60 | ▲ Δ-x ⊙ Δ-x | Comparative Example |
| 35 | *T | 1100 | 830 | 80 | 9 | 800 | 15 | 1.0 | 34.3 | 45.8 | 74.9 | ▲x | 21.5 | 0.63 | ⊙ ⊙-° | Comparative Example |

*Outside the range of the present invention
▲ Lower level than the present invention

We claim:
1. A method of producing a building low yield ratio hot-dip galvanized cold rolled steel sheet having an improved refractory property, comprising the steps of:
   forming a slab from a steel consisting essentially of, by weight, 0.1% or less of C, 0.1 to 1.5% of Mn, 0.1% or less of P, 0.06% or less of Al, 0.6 to 2.0% of Cu, and a remainder of Fe and unavoidable impurities,
   immediately or after heating the slab at a temperature of 1200° C. or less, hot rolling the slab at a temperature of 750° C. or more, cold rolling the slab, and effecting a continuous hot-dip galvanizing process by heating the rolled slab at a temperature of 700° to 900° C. in a reducing atmosphere, cooling the rolled slab at an average cooling rate of 3° C./sec or more and dipping the rolled slab in a hot-dip galvanizing bath, whereby the obtained product has a 0.6 times or more yield point strength at 600° C. compared to that at normal temperatures.

2. A method of producing a building low yield ratio hot-dip galvanized cold rolled steel sheet having an improved refractory property, comprising the steps of:
   forming a slab from a steel consisting essentially of, by weight, 0.02 to 0.1% of C, 0.3% or less of Si, 0.3 to 1.5% of Mn, 0.05% or less of P, 0.05% or less of Al, 0.6 to 2.0% of Cu, and a remainder of Fe and unavoidable impurities,
   immediately or after heating the slab at a temperature of 950° to 1150° C., hot rolling the slab at a temperature of 750° to 900° C. to form a hot rolled coil, cold rolling the coil, and effecting a continuous hot-dip galvanizing process by heating the coil at a temperature of 700° to 900° C. in a reducing atmosphere, cooling the coil at an average cooling rate of 3° C./sec or more and dipping the coil in a hot-dip galvanizing bath, so that the obtained product has a 0.6 times or more yield point strength at 600° C. compared to that at normal temperatures.

3. A method of producing a building low yield ratio hot-dip galvanized cold rolled steel sheet having an improved refractory property, comprising the steps of:
   forming a slab from a steel consisting essentially of, by weight, 0.2 to 0.1% of C, 0.3% or less of Si, 0.3 to 1.5% of Mn, 0.05% or less of P, 0.05% or less of Al, 0.6 to 2.0% of Cu, 0.2 to 1.0 of Ni by Ni/Cu and a remainder of Fe and unavoidable impurities,
   immediately or after heating the slab at a temperature of 950° to 1200° C., hot rolling the slab at a temperature of 750° to 900° C. to form a hot rolled coil, cold rolling the coil, and effecting a continuous hot-dip galvanizing process by heating the coil at a temperature of 700° to 900° C. in a reducing atmosphere, cooling the coil at an average cooling rate of 3° C./sec or more and dipping the coil in a hot-dip galvanizing bath, so that the obtained product has a 0.6 times or more yield point strength at 600° C. compared to that at normal temperatures.

4. A method of producing a building low yield ratio hot-dip galvanized cold rolling steel sheet having an improved refractory property, comprising the steps of:
   forming a slab from a steel consisting essentially of, by weight, 0.01% or less of C, 0.1 to 0.5% of Mn, 0.1% or less of P, 0.06% or less of Al, 0.6 to 2.0% of Cu, and a remainder of Fe and unavoidable impurities,
   immediately or after heating the slab at a temperature of 1150° C. or less, hot rolling the slab at an Ar₃ critical temperature to form a hot rolled coil, cold rolling the coil, and effecting a continuous hot-dip galvanizing process by heating the coil at a temperature of 750° to 900° C. with an average temperature rise speed of 1° C./sec in a reducing atmosphere, cooling the coil at an average cooling rate of 3° C./sec or more and dipping the coil in a hot-dip galvanizing bath, so that the obtained product has a 0.6 times or more yield point strength at 600° C. compared to that at normal temperatures.

5. A building low yield ratio hot-dip galvanized cold rolling steel sheet having an improved refractory property, consisting essentially of, by weight, 0.1% or less of C, 0.1 to 1.5% of Mn, 0.1% or less of P, 0.06% or less of Al, 0.6 to 2.0% Cu, and a remainder of Fe and unavoidable impurities, and solid-dissolved Cu at normal temperature, and having a 0.6 times or more yield point strength at 600° C. compared to that at normal temperature.

6. A building low yield ratio hot-dip galvanized cold rolled steel sheet having an improved refractory property, consisting essentially of, by weight, 0.02 to 0.1% of C, 0.3% or less of Si, 0.3 to 1.5% of Mn, 0.05% or less of P, 0.05% or less of Al, 0.6 to 2.0% of Cu, and a remainder of Fe and unavoidable impurities, and solid-dissolved Cu at normal temperature, and having a 0.6 times or more yield point strength at 600° C. compared to that at normal temperatures.

7. A building low yield ratio hot-dip galvanized cold rolled steel sheet having an improved refractory property, consisting essentially of, by weight, 0.01% or less of C, 0.1 to 0.5% of Mn, 0.1% or less of P, 0.06% or less of Al, 0.6 to 2.0% of Cu, and a remainder of Fe and unavoidable impurities, and solid-dissolved strengthening by Cu at normal temperature, and having a 0.6 times or more yield point strength at 600° C. compared to that at normal temperatures.

8. A building low yield ratio hot-dip galvanized cold rolled steel sheet having an improved refractory property, according to claim 7, and further containing at least one member selected from the group consisting of 0.008 to 0.2% by weight of Ti and 0.008 to 0.1% by weight of Nb.

9. A building low yield ratio hot-dip galvanized cold rolled steel sheet having an improved refractory property, according to claim 7, and further containing at least one member selected from the group consisting of 0.0001 to 0.003% by weight of B and 0.2 to 1.0 of Ni by Ni/Cu.

10. A building low yield ratio hot-dip galvanized cold rolled steel sheet having an improved refractory property, according to claim 8, and further containing at least one member selected from the group consisting of 0.0001 to 0.003% by weight of B and 0.2 to 1.0 of Ni by Ni/Cu.

11. A method of producing a building low yield ratio hot-dip galvanized cold rolled steel sheet having an improved refractory property, according to claim 4, wherein said steel further contains at least one member selected from the group consisting of 0.008 to 0.2% by weight of Ti and 0.008 to 0.10% by weight of Nb.

12. A method of producing a building low yield ratio hot-dip galvanized cold rolled steel sheet having an improved refractory property, according to claim 4, wherein said slab further contains at least one member selected from the group consisting of 0.0001 to 0.003% by weight of B and 0.2 to 1.0 of Ni by Ni/Cu.

13. A method of producing a building low yield ratio hot-dip galvanized cold rolled steel sheet having an improved refractory property, according to claim 11, wherein said slab further contains at least one member selected from the group consisting of 0.0001 to 0.003% by weight of B and 0.2 to 1.0 of Ni by Ni/Cu.

14. A building low yield ratio hot-dip galvanized cold rolled steel sheet having an improved refractory property, according to claim 6, and further containing 0.2 to 1.0 of Ni by Ni/Cu.

* * * * *